3,850,985
PROCESS FOR THE PRODUCTION OF
ACYLISOCYANATES
Hermann Hagemann, Cologne-Flittard, Germany,
assignor to Bayer Aktiengesellschaft
No Drawing. Continuation of abandoned application Ser.
No. 70,928, Sept. 9, 1970. This application Feb. 23,
1973, Ser. No. 335,196
Int. Cl. C07c *119/04*
U.S. Cl. 260—545 R         6 Claims

ABSTRACT OF THE DISCLOSURE

Acylisocyanates are produced by reacting an *a*-chloroalkylidene carbamic acid chloride with an anhydrous strong acid containing dissociable hydrogen attached to oxygen. The acylisocyanates produced are useful as dehydrating agents and modifiers in the synthesis of polyurethane plastics.

---

This is a continuation of Application Ser. No. 70,928, filed Sept. 9, 1970, now abandoned.

This invention relates to acylisocyanates. More particularly, this invention relates to the process for the production of acylisocyanates which avoids the use of phosgene.

A wide variety of processes are known for the production of organic isocyanates. The process in most general use, however, is that of phosgenation of primary amines. The use of phosgene, however, is hazardous and phosgene is poisonous. In addition, however, other methods not requiring phosgene are known for the preparation of organic isocyanates including, for example, the Curtius rearrangement of acid azides as well as the Hofmann and Lossen rearrangements. Moreover, it is known to thermally decompose carbamates and ureas to form the corresponding isocyanates. Still another method of preparing isocyanate while avoiding the use of phosgene is to react an N,N-disubstituted or trisubstituted urea with a relatively high boiling isocyanate. The latter process results in the isocyanate separating out and leaving the organic radical of the starting material on the urea. This process, however, suffers from the disadvantage that the ureas are not very soluble in the isocyanates so that large excesses of the isocyanate initially employed are required. It has also been disclosed that isocyanide dichlorides can be reacted with carboxylic acid anhydrides to form isocyanates; Agnew. Chemie, 77, 1031 (1965). Unfortunately this reaction results only in moderate yields of isocyanates. It is desirable to have a process for the production of isocyanates which avoids the use of phosgene because some of the amines have other phosgene sensitive groups in the molecule. Furthermore, not all isocyanates are obtainable by the phosgenation of amines. It is also desirable to have a process for the production of isocyanates yielding relatively high yields of isocyanates in addition to avoiding the use of phosgene.

It is, therefore, an object of this invention to provide a process for the production of acylisocyanates which avoids the use of phosgene. A further object of this invention is to provide a process for the production of acylisocyanates in relatively high yields. A further additional object of this invention is to provide a process for producing acylisocyanates from *a*-chloroalkylidene crabamic acid chlorides. A still further object of this invention is to provide a process for the preparation of acylisocyanates from *a*-chloroalkylidene carbamic acid chlorides having high yields of acylisocyanates.

The foregoing objects and others which will become apparent from the following description are accomplished in accordance with this invention, generally speaking, by providing a process for the production of acylisocyanates wherein an *a*-chloroalkylidene carbamic acid chloride is reacted with an anhydrous strong acid which contains dissociable hydrogen atoms attached to oxygen atoms. More particularly, the objects of this invention are accomplished by preparing acylisocyanates by reacting *a*-chloroalkylidene carbamic acid chlorides with an anhydrous strong acid containing dissociable hydrogen atoms attached to oxygen atoms at temperatures of from about 10° C. to about 150° C. From about 0.7 to about 1.3 equivalents of anhydrous strong acid may be used per equivalent of *a*-chloroalkylidene carbamic acid chloride; it is preferred that the reactants be employed in substantially equimolar quantities.

The novel, chemically unique process of this invention comprises reacting an *a*-chloroalkylidene carbamic acid chloride with an anhydrous strong acid in which dissociable hydrogen atoms are attached to oxygen atoms, the reaction proceeding in accordance with the following reaction sequence:

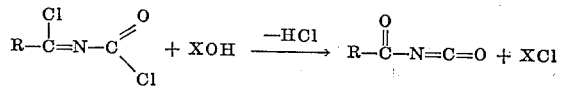

wherein X denotes the radical of a strong acid and R represents a halogen atom, a hydrogen atom, or alkyl, alkaryl, aralkyl, aryl, alkoxy, aroxy, alkaroxy, alkyl sulphenyl and arylsulphenyl radicals which may be substituted with any suitable substituent groups which are non-reactive with an isocyanato group or with the strong acid reactant, such as, for example, halo-, nitro-, sulfonyl chloride and the like. Preferably the radicals represented by R may be alkyl radicals having up to 18 carbon atoms and most preferably up to 6 carbon atoms; such alkyl radicals containing up to two ethylenically unsaturated double bonds in the radical; halo-substituted alkyl radicals wherein the halogen is preferably fluorine, chlorine or bromine; aralkyl and alkaryl radicals having up to 12 carbon atoms such as a naphthyl substituted ethyl radical but most preferably, benzyl; aryl, aroxy radicals having up to 10 carbon atoms, most preferably phenyl and phenoxy; said aryl, aralkyl, alkaryl and aroxy radicals substituted by lower alkyl or alkoxy groups having up to 4 carbon atoms, nitro, sulfonyl chloride or halogen atoms, most preferably fluorine, chlorine, or bromine; alkoxy radicals having from 1 to 6 carbon atoms; or said alkoxy radicals substituted by halogen atoms, most preferably, fluorine, chlorine or bromine. In the process of this invention the unreacted strong acid is converted into the acid chloride which, if desired, may be converted back into the acid by reaction with water.

Some suitable radicals corresponding to the foregoing description are alkyl radicals such as, for example, methyl, ethyl, n-propyl, isopropyl, n-butyl, iso-butyl, sec-butyl, t-butyl, the various positional isomers of methyl-butyl, dimethyl-propyl, ethyl-propyl, including the corresponding straight and branched chain isomers of pentyl, hexyl, heptyl, octyl, decyl, dodecyl, tetradecyl, hexadecyl, octadecyl, ethylidene, vinylidene and the like; Halo-substituted alkyl radicals such as, for example, chloromethyl, trichloromethyl, chloroethyl, dichloroethyl, chlorohexyl, fluoromethy, fluoropropyl, fluorohexyl, bromomethyl, dibromomethyl, bromohexyl and the like.

Aryl radicals such as, for example, phenyl, naphthyl, diphenyl, fluorophenyl, chlorophenyl, pentachlorophenyl, bromophenyl and the like; aralkyl radicals, such as, for example, phenylmethyl, phenylethyl, phenylpropyl, phenylmethoxy, phenylethoxy, phenylpropoxy, chlorophenylmethoxy, bromophenylmethoxy, benzyl, phenylbutyl, naphthylethyl and the like; alkaryl radicals such as, for example, methylphenyl, ethylphenyl, t-butylphenyl, chloromethylphenyl, trifluoromethylphenyl, and the like.

Alkoxyl radicals such as, for example, methoxy, ethoxy, propoxy, butoxy, chloromethoxy, chloroethoxy, and the like; aroxy radicals such as, for example, phenoxy, naphthoxy, t-butylphenoxy, chlorophenoxy, fluorophenoxy, bromophenoxy and the like.

Alkyl and arylsulphenyl radicals such as, for example, methylsulphenyl, ethylsulphenyl, propylsulphenyl, hexylsulphenyl, chloromethylsulphenyl, fluorohexylsulphenyl, phenylsulphenyl, naphthylsulphenyl, chlorophenylsulphenyl, bromophenylsulphenyl and the like.

The process of this invention is suitable for the production of any acylisocyanates of the formula $$R-\overset{O}{\underset{\|}{C}}-N=C=O$$

from a-chloroalkylidene carbamic acid chlorides of the formula $$R-\overset{Cl}{\underset{|}{C}}=N-\overset{O}{\underset{\diagdown Cl}{C}\diagup}$$

wherein R is as defined hereinabove.

Although acylisocyanates may be prepared from any of the corresponding within the scope of the formula set forth above, the following may be mentioned as examples of suitable a-chloroalkylidene carbamic acid chlorides:

$$H-\underset{\underset{Cl}{|}}{C}=N-COCl$$

$$Cl-\underset{\underset{Cl}{|}}{C}=N-COCl$$

$$CH_3-\underset{\underset{Cl}{|}}{C}=N-COCl$$

$$CHCl_2-\underset{\underset{Cl}{|}}{C}=N-COCl$$

$$C_2Cl_5-\underset{\underset{Cl}{|}}{C}=N-COCl$$

$$C_6H_{10}Cl_3-\underset{\underset{Cl}{|}}{C}=N-COCl$$

$$CCl_3-\underset{\underset{Cl}{|}}{C}=N-COCl$$

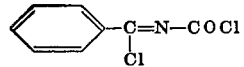

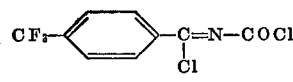

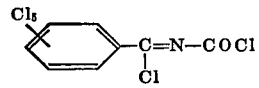

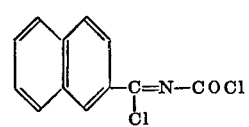

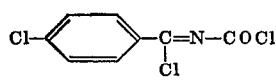

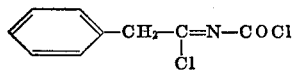

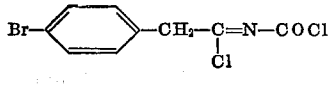

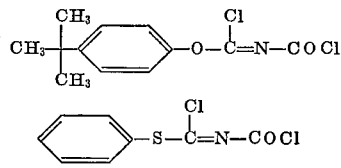

It is of course to be understood that any of the radicals given as suitable hereinabove may be substituted for those contained in the foregoing specific examples of a-chloroalkylidene carbamic acid chlorides.

Any suitable anhydrous strong acid containing dissociable hydrogen atoms may be used according to the process of this invention such as, for example, those corresponding to the formula $$XOH$$

wherein X is the radical of a strong acid. As examples of suitable strong acids there may be mentioned aliphatic and aromatic sulphonic acids such as, for example, methane sulphonic acid, chloromethane sulphonic acid, benzene sulphonic acid, dodecylbenzene sulphonic acid, toluene sulphonic acid and the like, aliphatic and aromatic phosphonic acids and the like, strong carboxylic acids such as, for example, dichloroacetic acid, trichloroacetic acid, trifluoroacetic acid and the like, inorganic acids such as halosulphonic acids and the like, examples of which are chlorosulphonic acid and fluorosulphonic acid as well as halophosphoric acids such as, for example, dichlorophosphoric acid and the like. These acids are preferably employed in substantially equimolar quantities with regards to the a-chloroalkylidene carbamic acid chlorides.

The isocyanates produced according to the process of the invention are particularly useful as intermediates in for example, the synthesis of polyurethane, which, as is well known are obtained from polyisocyanates and compounds which contain reactive hydrogen atoms, preferably hydroxyl groups. In this application the isocyanates of the invention have, for example, a chain breaking action. Owing to their high reactivity, the products of the invention may be also used as dehydrating agents in organic systems such as, for example, in lacquer compositions. The polyurethanes obtained using the isocyanates prepared according to the invention are homogeneous or cellular resins, i.e., elastomers or hard and soft foams or lacquers.

The invention is further illustrated but it is not intended that it be limited by the following examples in which all parts and percentages are by weight unless otherwise indicated.

EXAMPLE 1

Preparation of:

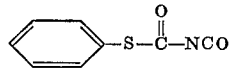

About 133.5 parts (0.57 mol) of an adduct of phosgene with phenyl thiocyanate:

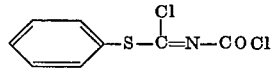

are introduced into the reaction vessel and about 54.8 parts (0.57 mol) of methane sulphonic acid are added dropwise in the course of about one hour at about 50° C. Vigorous evolution of HCl occurs which is completed after about 2 hours heating at about 100° C. about 94 parts (92% of theoretical) of phenylsulphenyl carbonyl isocyanate of boiling point of 120° C./14 mm. Hg are obtained by distillation of the methanesulphochloride which has been formed at the same time.

EXAMPLE 2

Preparation of:

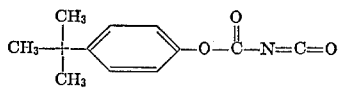

About 64 parts (0.23 mol) of an adduct of phosgene with p-tertiary butylphenylcyanate:

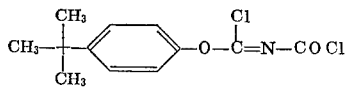

are reacted as in Example 1 with about 22.5 parts (0.23 mol) of methane sulphonic acid at from about 75 to about 90° C. and heated at about 125° C. for about 2 hours. After a fore run of about 24 parts of methane sulphochloride, about 38 parts (75% of theoretical) of p-tertiary butylphenoxycarbonyl isocyanate (boiling point 125 to 140° C.) are obtained.

EXAMPLE 3

Preparation of:

About 229.5 parts (1.43 mol) of an adduct of phosgene and cyanogen chloride

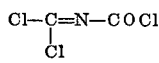

are introduced into the reaction vessel and about 137.5 parts (1.43 mol) of methylsulphonic acid are added dropwise at about 20° C. at such a rate that the reaction temperature rises to about 50° C.

The hydrogen chloride bound as carbamic acid chloride is then driven off through a column in the course of about 5 hours while the sump temperature is slowly raised, and the N-chlorocarbonyl isocyanate remaining behind is separated from the ethyl sulphochloride by distillation. About 106 parts (70% of theoretical) of N-chlorocarbonyl isocyanate of boiling point 64° C./760 mm. Hg are obtained.

The following acylisocyanates are prepared in a manner analogous to Examples 1 to 3:

4. 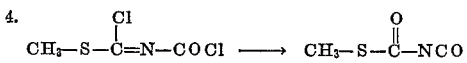

Boiling point: 130 to 134° C.

5. 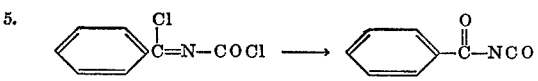

Boiling point: 90°/15 mm. Hg

6. 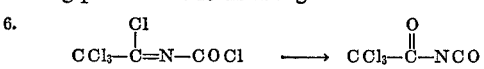

Boiling point: 147 to 149° C.

7. 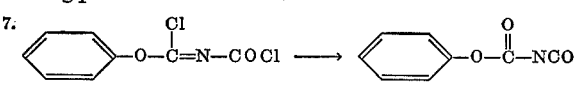

Boiling point: 100°/15 mm. Hg

Although the invention has been described in considerable detail in the foregoing it is to be understood that such detail is solely for the purpose of illustration and that many variations might be made by one skilled in the art without departing from the spirit and scope of the invention.

What is claimed is:

1. A process for the production of acylisocyanates of the formula;

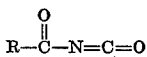

comprising reacting at a temperature of from about $-10°$ C. to about 150° C. one equivalent of an $a$-chloroalkylidene carbamic acid chloride of the formula:

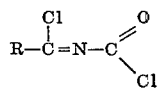

wherein R in the above formulas is halogen, hydrogen, alkyl of up to 18 carbon atoms; aryl, aralkyl, or alkaryl of up to 12 carbon atoms; aroxy of up to 10 carbon atoms or alkoxy of up to 6 carbon atoms; with from about 0.7 to about 1.3 equivalents of an anhydrous chlorophosphoric acid, methane sulphonic acid, chloromethane sulphonic acid, benzene sulphonic acid, dodecylbenzene sulphonic acid, tolylene sulphonic acid, dichloroacetic acid, trichloroacetic acid, trifluoroacetic acid, chlorosulphonic acid or fluorosulphonic acid.

2. The process of Claim 1 wherein said $a$-chloroalkylidene-carbamic acid chloride is reacted with methane sulphonic acid.

3. The process of Claim 1 wherein the reaction is conducted in the presence of an inert organic diluent.

4. The process of Claim 1 wherein the $a$-chloroalkylidene carbamic acid chloride reactant is selected from the group consisting of

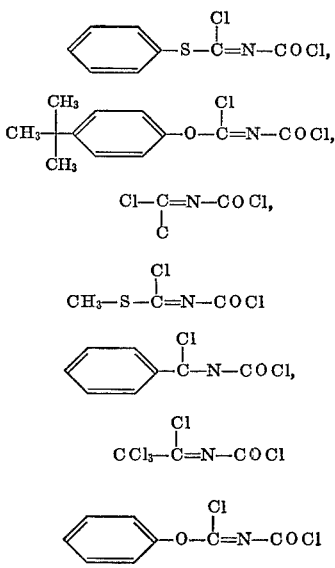

5. The process of Claim 1 wherein the alkyl and alkoxy radicals are substituted by halogen, and the aryl, aralkyl, alkaryl and aroxy radicals are substituted by a substituent selected from the group consisting of alkyl or alkoxy of up to 4 carbon atoms, nitro, sulfonyl chloride and halogen.

6. The process of Claim 1 wherein the anhydrous acid is a chlorophosphoric acid.

References Cited

UNITED STATES PATENTS

| | | | |
|---|---|---|---|
| 3,213,135 | 10/1965 | Speziale et al. | 260—545 |
| 3,535,360 | 10/1970 | Holtschmidt et al. | 260—453 |
| 3,639,442 | 2/1972 | Arlt | 260—453 |

LEWIS GOTTS, Primary Examiner

D. H. TORRENCE, Assistant Examiner

U.S. Cl. X.R.

252—194; 260—2.5 AT, 77.5 AM

UNITED STATES PATENT OFFICE
CERTIFICATE OF CORRECTION

PATENT NO. : 3,850,985
DATED : November 26, 1974
INVENTOR(S) : Hermann Hagemann

It is certified that error appears in the above-identified patent and that said Letters Patent are hereby corrected as shown below:

Column 1, line 8, insert --Claims priority, application Germany, September 19, 1969, P 19 47 498.7--; same column, line 40, "N,N-disubstituted" should read --N,N'-disubstituted--; same column, line 64, "crabamic" should read --carbamic--.

Column 2, line 62, "fluoromethy" should read --fluoromethyl--;

Column 4, line 73, after "boiling point" delete "of";

Example 3, Column 5, line 22, after "Preparation of" insert

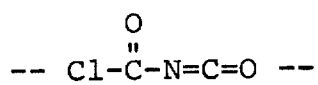

Claim 4, column 6, line 31, correct the formula to read

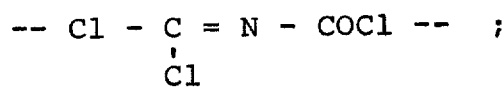

same claim, same column, line 40, correct the formula to read

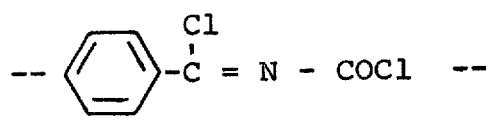

Signed and Sealed this seventeenth Day of February 1976

[SEAL]

Attest:

RUTH C. MASON
Attesting Officer

C. MARSHALL DANN
Commissioner of Patents and Trademarks